United States Patent
Okazaki et al.

(10) Patent No.: US 9,567,252 B2
(45) Date of Patent: Feb. 14, 2017

(54) OPTICAL FIBER DRAWING METHOD AND OPTICAL FIBER DRAWING APPARATUS

(71) Applicant: SUMITOMO ELECTRIC INDUSTRIES, LTD., Osaka-shi, Osaka (JP)

(72) Inventors: Iwao Okazaki, Yokohama (JP); Takashi Yamazaki, Yokohama (JP); Tatsuya Konishi, Yokohama (JP); Katsuyuki Tsuneishi, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/769,827

(22) PCT Filed: Feb. 18, 2014

(86) PCT No.: PCT/JP2014/053806
§ 371 (c)(1),
(2) Date: Aug. 24, 2015

(87) PCT Pub. No.: WO2014/129471
PCT Pub. Date: Aug. 28, 2014

(65) Prior Publication Data
US 2016/0002090 A1 Jan. 7, 2016

(30) Foreign Application Priority Data
Feb. 25, 2013 (JP) .................. 2013-034325

(51) Int. Cl.
C03B 37/027 (2006.01)
C03B 37/029 (2006.01)

(52) U.S. Cl.
CPC ....... *C03B 37/02736* (2013.01); *C03B 37/029* (2013.01); *C03B 2205/80* (2013.01); *C03B 2205/92* (2013.01)

(58) Field of Classification Search
CPC .................. C03B 37/027; C03B 37/029
(Continued)

(56) References Cited

U.S. PATENT DOCUMENTS

| 5,931,984 A | 8/1999 | Douart et al. |
| 2009/0038345 A1 | 2/2009 | Otosaka et al. |
| 2011/0265522 A1 | 11/2011 | Okada |

FOREIGN PATENT DOCUMENTS

| JP | H10-67532 A | 3/1998 |
| JP | 2003-171139 A | 6/2003 |

(Continued)

OTHER PUBLICATIONS

Japanese Office Action dated Nov. 8, 2016 from corresponding Japanese patent application No. 2013-034325, with attached English-language translation.

*Primary Examiner* — Mark Halpern
(74) *Attorney, Agent, or Firm* — Drinker Biddle & Reath LLP

(57) ABSTRACT

Capacity of space in a drawing furnace is decreased so as to reduce variations in pressure in the furnace and also the side of an insertion port of a glass preform is stably sealed. When drawing is started, an outer peripheral surface of the optical fiber glass preform 11 is sealed with a first seal part 17 of the seal mechanism. After a vicinity of a taper part of the optical fiber glass preform 11 starts to pass through the first seal part 17, switching to a second seal part 18 arranged above the first seal part 17 is performed, and an outer peripheral surface of a sleeve member 20 fixed so as to surround an outer periphery of the dummy rod 12 is sealed with the second seal part 18.

1 Claim, 5 Drawing Sheets

(58) Field of Classification Search
USPC .................................................. 65/435, 533
See application file for complete search history.

(56) References Cited

FOREIGN PATENT DOCUMENTS

| | | |
|---|---|---|
| JP | 2005-008475 A | 1/2005 |
| JP | 2009-062265 A | 3/2009 |
| JP | 2011-084409 A | 4/2011 |
| JP | 2011-230978 A | 11/2011 |
| JP | 2012-106915 A | 6/2012 |
| JP | 2013-151395 A | 8/2013 |

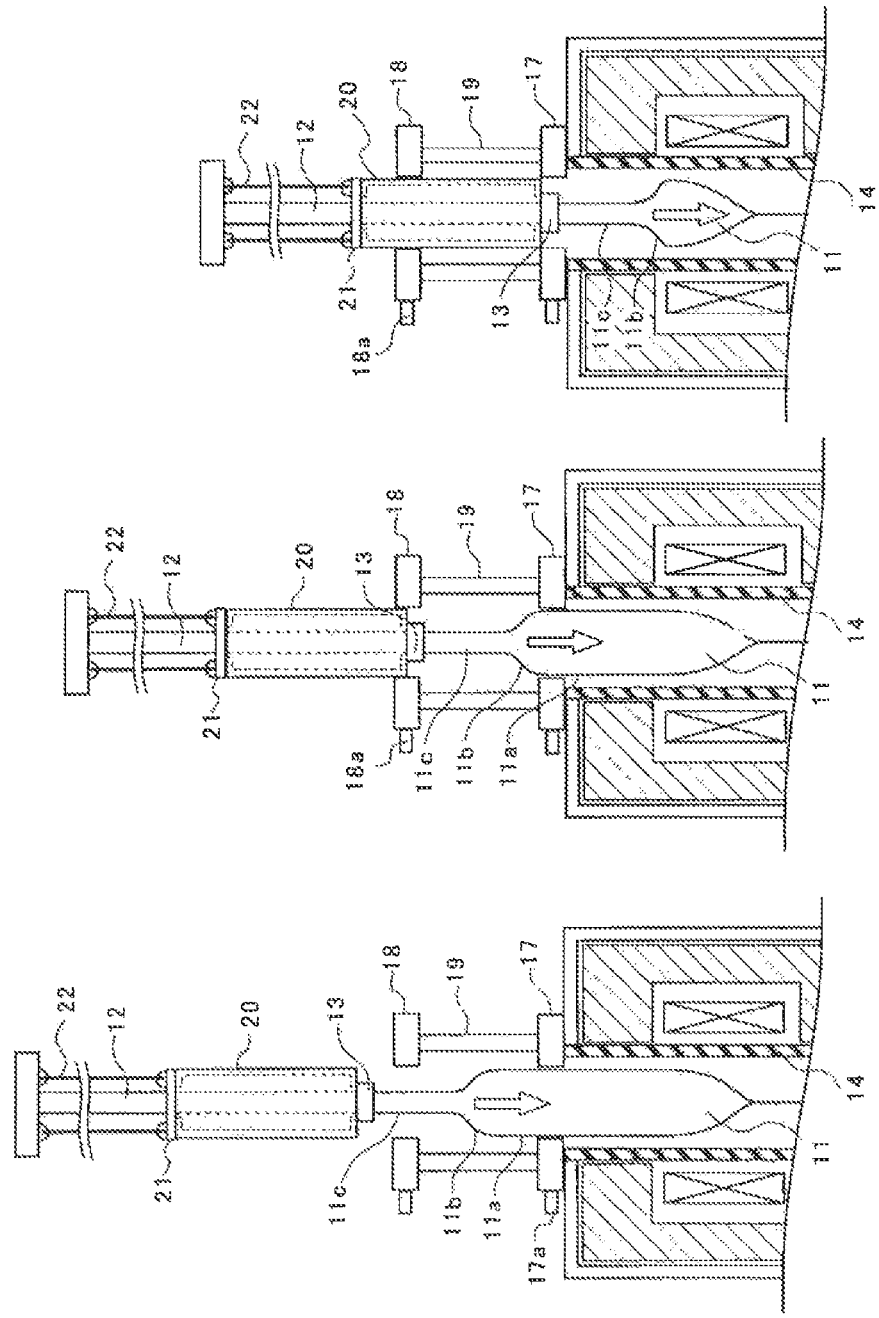

PRIOR ART

OPTICAL FIBER DRAWING METHOD AND OPTICAL FIBER DRAWING APPARATUS

This application is a 371 of PCT/JP2014/053806 filed 18 Feb. 2014

TECHNICAL FIELD

The present invention relates to an optical fiber drawing method and apparatus for drawing an optical fiber by heating and melting an optical fiber glass preform.

BACKGROUND ART

An optical fiber glass preform (hereinafter called a glass preform) is heated and melted by a heater etc. to thereby draw an optical fiber through a drawing furnace. Since the temperature of the inside of the drawing furnace becomes very high (2000° C. or higher), carbon is normally used in, for example, a furnace core tube for surrounding the glass preform. This carbon is oxidized and consumed in a high-temperature oxygen-containing atmosphere. In order to prevent this state, nitrogen gas or rare gas such as argon gas or helium gas (hereinafter called an inert gas etc.) is fed to the inside of the drawing furnace.

Also, normally, a diameter of the upper end of the glass preform is decreased in a taper shape and a dummy rod (also called a support rod) with a small diameter is connected and the glass preform is hung and supported inside the furnace core tube of the drawing furnace, but it is difficult to seal a joining portion of the dummy rod and the tapered portion with the diameter changing greatly, and it is difficult to fill the inside of the drawing furnace with the inert gas etc. As a result, there is a method in which an upper chamber is formed above the drawing furnace in a form of upwardly extending the furnace core tube and the glass preform including the joining portion of the dummy rod and the tapered portion is received inside the upper chamber and an outer peripheral surface of the dummy rod is sealed with the upper end of the upper chamber.

However, in this method, as drawing of the glass preform progresses and the glass preform is downwardly moved, capacity of space in the upper chamber is increased, with the result that pressure in the furnace varies and the flow of gas such as the inert gas fed to the inside of the furnace core tube changes with time and thereby, the amount of heat transfer of a melt part of the glass preform changes and the diameter of the glass fiber during the drawing varies.

On the other hand, for example, Patent Reference 1 discloses a method for forming a pipe with the same diameter as that of a glass preform above the glass preform and maintaining capacity of space in an upper chamber substantially constant even when drawing of the glass preform progresses.

FIG. 5A is a diagram showing an example of a drawing furnace disclosed in Patent Reference 1 described above. A glass preform 1 has a diameter contracted part 1c (also called a seed rod) in which a diameter of the upper end of a straight trunk part 1a (body part) is contracted through a taper part 1b, and is hung and supported by joining a dummy rod 2 (a shaft or a support rod) to the diameter contracted part 1c using, for example, a joining member 3. The outside of the dummy rod 2 is provided with a quartz pipe 10 having substantially the same outside diameter as an outside diameter of the straight trunk part 1a of the glass preform 1, and a pipe lower end 10a abuts on the peripheral edge of the taper part 1b of the glass preform 1.

A heating furnace is constructed by providing the outside of a furnace core tube 4 with a heater 5 and covering the outside of the heater 5 with a heat insulating material and surrounding the whole by a furnace cabinet 6, and an upper chamber 9 including a seal unit 7 is installed on an upper surface of the furnace cabinet 6. In addition, an inert gas etc. are supplied to the inside of the furnace core tube 4 from a gas supply port 9a formed in the upper chamber 9. According to this configuration of FIG. 5A, the quartz pipe 10 having the same diameter is downwardly moved together as the glass preform 1 is downwardly moved, with the result that space (capacity) in the drawing furnace can be maintained constant.

On the other hand, for example, Patent Reference 2 discloses a known method for continuously sealing a joining portion of a dummy rod and a tapered portion of a glass preform with a diameter changing greatly without using an upper chamber.

FIG. 5B is a diagram schematically showing a drawing furnace disclosed in Patent Reference 2 described above. This drawing furnace includes a first seal unit 7 with which a gap between a glass preform 1 and an insertion port into a heating furnace is sealed, and a second seal unit 8 for forming a seal so as to cover a taper part 1b when the taper part 1b with a contracted diameter of the glass preform 1 passes through the insertion port.

Like the example of FIG. 5A, the glass preform 1 has a diameter contracted part 1c whose diameter is contracted through the taper part 1b above a straight trunk part 1a, and is hung and supported by joining a dummy rod 2 to the diameter contracted part 1c using, for example, a joining member 3. The heating furnace is constructed by providing the outside of a furnace core tube 4 with a heater 5 and covering the outside of the heater 5 with a heat insulating material and surrounding the whole by a furnace cabinet 6.

An upper surface of the furnace cabinet 6 is provided with the first seal unit 7 with which the straight trunk part 1a of the glass preform 1 is sealed. And, the upper end side of the glass preform 1 is provided with the second seal unit made of a cap member 8 (cylindrical member) having a seal part 8a for sealing the dummy rod 2 insertably so as to surround the taper part 1b, the diameter contracted part 1c and the joining member 3. In addition, an inert gas etc. are supplied to the inside of the furnace core tube 4 from a gas supply port 7a formed in the first seal unit 7.

When drawing of the glass preform 1 progresses and the taper part 1b of the glass preform 1 reaches the first seal unit 7, the cap member 8 which is the second seal unit abuts on the first seal unit 7 as shown by a broken line, and the portions of the joining member 3 and the diameter contracted part 1c above the taper part 1b are sealed. As a result, after the taper part 1b of the glass preform 1 passes through the first seal unit 7, the drawing can subsequently be continued with a sealed state maintained.

In addition, other seal units include, for example, a structure of forming a seal using a pressing mechanism for bringing plural blade members into contact with an outer peripheral surface as disclosed in Patent Reference 3.

PRIOR ART REFERENCE

Patent Reference

Patent Reference 1: JP-A-2011-84409
Patent Reference 2: JP-A-2009-62265
Patent Reference 3: JP-A-2012-106915

SUMMARY OF THE INVENTION

Problems that the Invention is to Solve

The drawing furnace using the upper chamber 9 of FIG. 5A has a problem that capacity of space in the drawing furnace by the upper chamber is large and pressure in the furnace tends to vary. Also, the capacity of space in the drawing furnace can be maintained constant by using the quartz pipe 10, but there are problems that post-treatment by welding of the quartz pipe 10 to the glass preform 1 requires time and effort and also, the size of equipment is increased since the quartz pipe is long and the hang weight is increased. When the quartz pipe 10 is not welded to the glass preform 1, there is a problem that the capacity of space in the drawing furnace cannot be decreased since inside space of the quartz pipe 10 cannot be separated from outside space of the quartz pipe 10 used as the inside of the drawing furnace.

The drawing furnace using the cap member of FIG. 5B can solve the problems as described above, but has a problem that a seal state in the insertion port of the glass preform 1 is unstable since the peripheral edge of the lower end of the cap member 8 which is the second seal unit forms a seal by abutting on the first seal unit 7. Also, since capacity of space in the cap member is gradually increased as the seal by the cap member 8 is started and the glass preform 1 is consumed by drawing, there is a problem that the capacity of space in the drawing furnace is gradually increased and pressure in the furnace tends to vary.

The invention has been implemented in view of the actual circumstances as described above, and an object of the invention is to provide an optical fiber drawing method and apparatus capable of decreasing capacity of space in a drawing furnace and reducing variations in pressure in the furnace and also stably sealing the side of an insertion port of a glass preform.

Means for Solving the Problems

An optical fiber drawing method of the invention is an optical fiber drawing method for drawing an optical fiber by joining an optical fiber glass preform to a dummy rod and hanging and downwardly moving the optical fiber glass preform inside a drawing furnace while sealing with a seal mechanism of an upper part of the drawing furnace. When drawing is started, an outer peripheral surface of the optical fiber glass preform is sealed with a first seal part of the seal mechanism. After a vicinity of a taper part of the optical fiber glass preform starts to pass through the first seal part, switching to a second seal part arranged above the first seal part is performed, and an outer peripheral surface of a sleeve member fixed so as to surround an outer periphery of the dummy rod is sealed with the second seal part.

An optical fiber drawing apparatus of the invention is an optical fiber drawing apparatus including a drawing furnace which heats an optical fiber glass preform having a taper part in a state that the optical fiber glass is joined to a dummy rod, and a seal mechanism which obtains airtightness in an upper part of the drawing furnace. The seal mechanism comprises a first seal part with which an outer peripheral surface of the optical fiber glass preform is sealed, and a second seal part arranged above the first seal part, the second seal part with which an outer peripheral surface of a sleeve member fixed so as to surround an outer periphery of the dummy rod is sealed. When a distance between a lower end of the sleeve member and the taper part of the optical fiber glass preform is set at E and a distance between the first seal part and the second seal part is set at D, "E≤D" is satisfied.

An outside diameter of the sleeve member is ⅔ or more an outside diameter of the optical fiber glass preform and is less than or equal to an inside diameter of the second seal part. A lower side of the sleeve member is preferably closed so that inside space of the sleeve member is separated from outside space connected to an inside of the drawing furnace after passing through the second seal part.

Advantage of the Invention

According to the invention, the height of an upper chamber is decreased and the sleeve member is inserted into space in the furnace and thereby, capacity of space in the drawing furnace can be decreased and variations in pressure in the furnace can be reduced. Also, the first seal part with which the outer peripheral surface of the glass preform is sealed and the second seal part with which the sleeve member is sealed can use the seal mechanism of the same form, and a stable seal can be achieved.

BRIEF DESCRIPTION OF THE DRAWINGS

FIGS. 3A to 3C are diagrams describing operation of a seal mechanism of FIG. 1.

MODE FOR CARRYING OUT THE INVENTION

Figure 1:
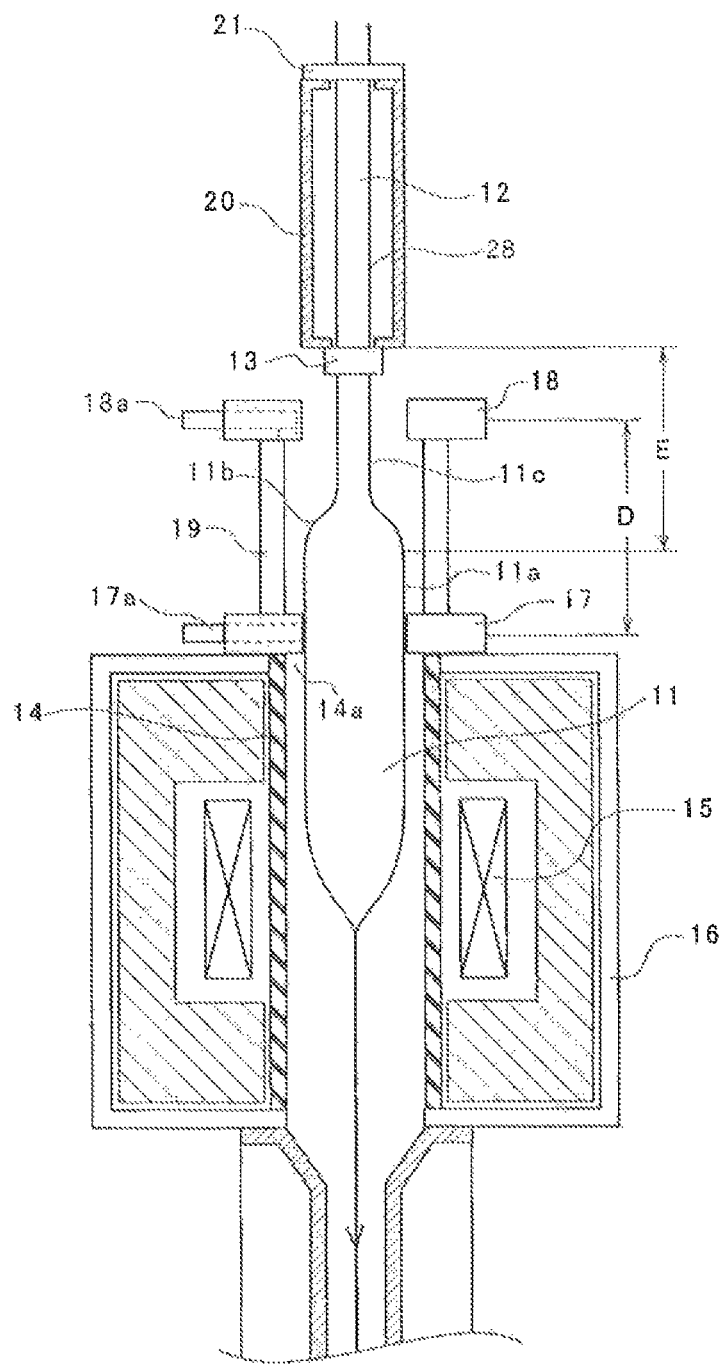
FIG. 1 is a diagram describing an outline of an optical fiber drawing apparatus according to an embodiment of the invention.

A concrete example of an optical fiber drawing method and an optical fiber drawing apparatus according to an embodiment of the invention will hereinafter be described with reference to the drawings.

In addition, a resistance furnace for heating a furnace core tube by a heater will be described below by way of example, but the invention can also be applied to an induction furnace for applying a high-frequency power source to a coil and inductively heating a furnace core tube.

In FIGS. 1 to 4, numeral 11 shows a glass preform, and numeral 11a shows a straight trunk part, and numeral 11b shows a taper part, and numeral 11c shows a diameter contracted part, and numeral 12 shows a dummy rod, and numeral 13 shows a joining member, and numeral 14 shows a furnace core tube, and numeral 15 shows a heater, and numeral 16 shows a furnace cabinet, and numeral 17 shows a first seal part, and numeral 17a shows a gas supply port, and numeral 18 shows a second seal part, and numeral 18a shows a gas supply port, and numeral 19 shows an upper chamber, and numeral 20 shows a sleeve member, and numeral 21 shows a lid member, and numeral 22 shows a hang member.

A drawing furnace of an optical fiber has a structure in which a lower part of the optical fiber glass preform 11 hung and supported is heated and the glass preform 11 is melted and drooped from the melted lower end so that the glass fiber becomes a predetermined outside diameter as shown in FIG. 1.

Figure 2A:
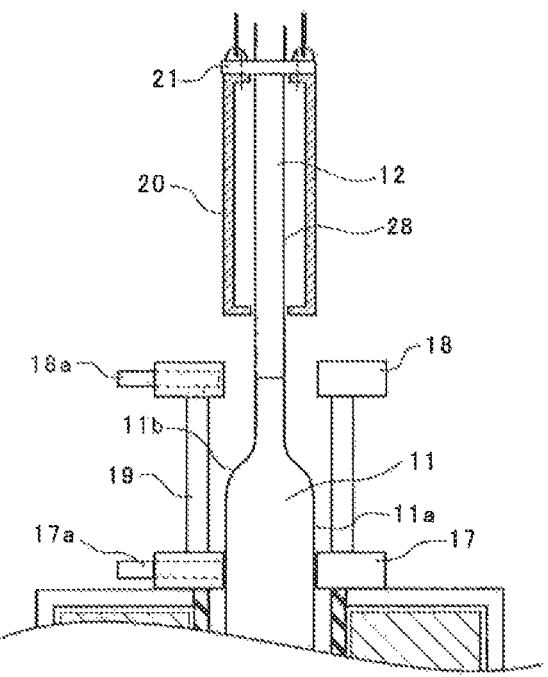
FIGS. 2A, 2B are diagrams showing an example of another optical fiber drawing apparatus according to the embodiment of the invention.
Figure 2B:
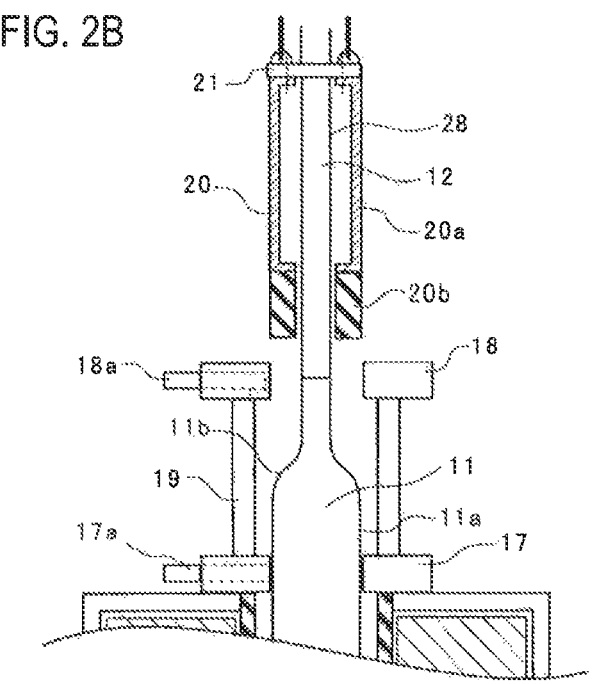

In addition, a mode in which the glass preform 11 is joined to the dummy rod 12 by the joining member 13 etc. and the dummy rod 12 is gripped and the optical fiber is drawn will be described below by way of example, but the invention is not limited to this example. For example, as shown in FIGS. 2A and 2B, it may be constructed so that the lower end of the dummy rod 12 is directly welded to the glass preform 11 and the dummy rod 12 is gripped without the joining member 13 and the optical fiber is drawn.

The glass preform 11 has the diameter contracted part 11c (also called a seed rod) in which a diameter of the upper end of the straight trunk part 11a (body part) is contracted through the taper part 11b, and the dummy rod 12 is joined to the diameter contracted part lie using the joining member 13 etc. as shown in, for example, FIG. 1. Then, by hanging the upper end of the dummy rod 12 and gripping the dummy rod 12 with a support device (not shown), the glass preform 11 is hung and supported movably in a vertical direction and is inserted and supplied to the inside of the drawing furnace.

A heating furnace used as a main body of the drawing furnace is constructed so that the heater 15 for heating is arranged so as to surround the furnace core tube 14 to which the glass preform 11 is inserted and supplied and the heater 15 is surrounded by a heat insulating material such as carbon so as not to dissipate heat of this heater 15 to the outside and all the outside of the heat insulating material is surrounded by the furnace cabinet 16. The upper side of the furnace cabinet 16 has an insertion port 14a into which the glass preform 11 is inserted in the upper end of the furnace core tube 14.

The present embodiment provides the drawing method and apparatus including a seal mechanism for effectively sealing the portion ranging from the straight trunk part 11a to the taper part 11b and the diameter contracted part 11c of the glass preform 11 and decreasing capacity of space in the drawing furnace and also reducing variations in increase in the capacity of space.

In the embodiment, as the seal mechanism for this purpose, the first seal part 17 is first installed on an upper surface of the furnace cabinet 16 so as to seal a gap with the straight trunk part 11a of the glass preform 11 in the insertion port 14a of the glass preform 11.

Figures 5A, 5B:
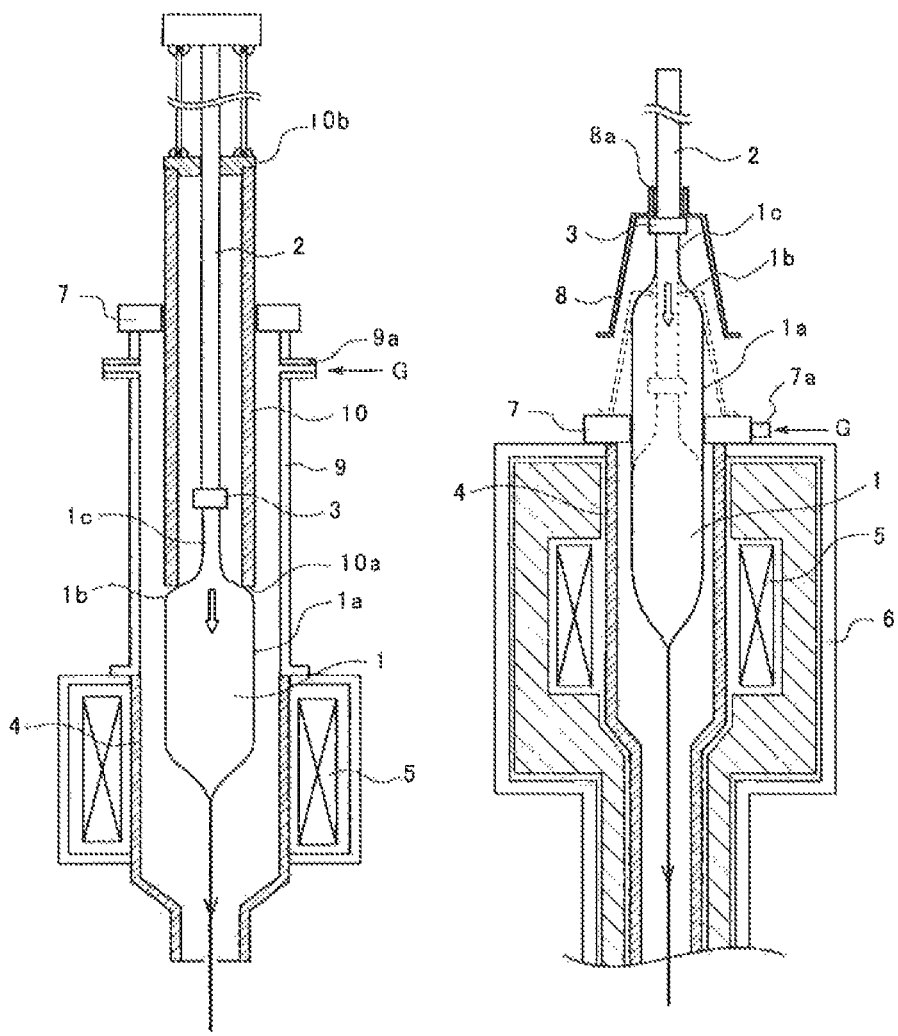
FIGS. 5A, 5B are diagrams describing a conventional art.

The upper side of the first seal part 17 is provided with the cylindrical upper chamber 19 whose height is lower than that of an upper chamber shown in FIG. 5A. The upper end of this upper chamber 19 is provided with the second seal part 18 having the same function as the first seal part 17. In addition, the first seal part 17 and the second seal part 18 can be respectively provided with the gas supply ports 17a, 18a for supplying an inert gas etc. to the inside of the furnace core tube 14.

Also, the dummy rod 12 is provided with the sleeve member 20 so as to surround an outer periphery 28 of the dummy rod 12. This sleeve member 20 is formed of, for example, quartz glass, metal, carbon, or SiC-coated carbon with heat resistance, and an outside diameter of the sleeve member 20 is equal to or ⅔ or more an outside diameter of the glass preform 11. Also, the sleeve member 20 is preferably processed, for example, ground so as to have accuracy higher than or equal to variations in the outside diameter of the glass preform 11.

In addition, the sleeve member 20 may be constructed so that a sleeve upper portion 20a is formed of quartz glass or metal and a lower portion 20b is formed of carbon with heat resistance as shown in FIG. 2B.

This sleeve member 20 is arranged above the diameter contracted part 11c of the glass preform by, for example, locking concentrically so as to surround the outer periphery 28 of the dummy rod 12 using, for example, the lid member 21 or the joining member 13. In addition, the sleeve member 20 during drawing is preferably fixed so as not to be moved axially with respect to the dummy rod 12, and is hermetically arranged so that inside space of the sleeve member 20 is separated from outside space connected to the inside of the drawing furnace.

The first seal part 17 and the second seal part 18 are means for annularly sealing an outer peripheral surface of the sleeve member 20 or the glass preform 11 axially moved through a through hole and preventing the outside air from entering a gap with the through hole, and can also inhibit an internal gas from leaking to the outside. For example, a structure of forming a seal by urging a seal member such as a carbon sheet or a carbon felt arranged so as to annularly surround the outer peripheral surface of the sleeve member 20 or the glass preform 11 on the outer periphery of the sleeve member or the glass preform by pressure of a seal gas can be used.

Also, a structure, disclosed in Patent Reference 3, of forming a seal using a pressing mechanism for bringing plural blade members into contact with an outer peripheral surface so as to surround the sleeve member 20 or the glass preform 11 can be used. Moreover, a configuration of forming an annular seal body etc. on a seal gas supply spacer as shown in Patent Reference 2 can be used.

In addition, the first seal part 17 and the second seal part 18 may have the same seal structure or different seal structures.

FIGS. 3A to 3C are diagrams describing an operation state of the seal mechanism of the drawing furnace described above. FIG. 3A shows a state in which an upper part of the straight trunk part 11a of the glass preform 11 is present above the first seal part 17 and the outer periphery of the straight trunk part 11a is directly sealed with the first seal part 17 to prevent the outside air from entering the inside of the furnace core tube 14. In addition, in this stage, the inert gas etc. are supplied to the inside of the furnace core tube 14, for example, from the gas supply port 17a formed in the first seal part 17.

In addition, in the initial stage of drawing, the second seal part 18 may be in a position of the straight trunk part 11a of the glass preform 11, with the result that an outer peripheral surface of the glass preform 11 may be sealed with the second seal part 18 while the outer peripheral surface of the glass preform 11 is sealed with the first seal part 17. In that case, a gas flow rate is preferably adjusted properly so that pressure in the drawing furnace becomes substantially equal to pressure in the upper chamber 19.

Also, in this stage of FIG. 3A, the sleeve member 20 arranged in the dummy rod 12 is located in a position upwardly away from the second seal part 18, and the taper part 11b and the diameter contracted part 11c of the glass preform 11 and the joining member 13 etc. are in a state exposed to the outside air. Consequently, in the seal mechanism in this stage, only the first seal part 17 functions and the second seal part 18 does not perform seal operation, but it is necessary to fill the inside of the upper chamber 19 with the inert gas etc. in the next step, with the result that the inside of the upper chamber 19 is preferably filled with the inert gas etc. introduced from, for example, 17a, 18a.

FIG. 3B shows a state just before drawing of the glass preform 11 progresses and the taper part 11b is moved near to and passes through the first seal part 17. On the other hand, the lower end of the sleeve member 20 arranged in the dummy rod 12 reaches the second seal part 18, and a seal of an outer peripheral surface of the sleeve member 20 with the second seal part 18 becomes started. Then, after the taper part 11b reaches a position of the first seal part 17, a seal with the first seal part 17 is released.

In this stage, supply of the inert gas etc. to the inside of the furnace core tube 14 may be switched from the gas supply port 17a of the side of the first seal part 17 to the gas supply port 18a formed in the side of the second seal part 18, or does not have to be switched. Also, as described above, the inert gas etc. may be supplied from the gas supply port 18a before the seal with the first seal part 17 is released. In any case, in this state of FIG. 3B, the gas flow rate is preferably adjusted properly so that the pressure in the drawing furnace becomes substantially equal to the pressure in the upper chamber 19.

FIG. 3C shows one example of a state in which seal operation of the seal mechanism is switched from the first seal part 17 to the second seal part 18 and then the drawing of the glass preform 11 further progresses and the glass preform is melted to the vicinity of the taper part 11b. In this stage ranging from FIG. 3B to FIG. 3C, only the second seal part 18 functions, and the outer peripheral surface of the sleeve member 20 downwardly moved together with the dummy rod 12 is directly sealed with the second seal part 18, and the outside air is prevented from entering the inside of the drawing furnace.

In addition, timing at which the drawing is ended in any position of melt of the glass preform 11 can be set freely. When the sleeve member 20 becomes moved near to or inserted into the furnace core tube 14, these members may be melted and damaged depending on material of the sleeve member 20, with the result that it may become difficult to reuse the members, and the sleeve member 20 may reach the first seal part to seal the outer peripheral surface of the sleeve member 20 with the first seal part. In addition, when the sleeve member 20 is made of a heat-resistance material such as carbon rather than quartz, the sleeve member 20 can be prevented from being melted and damaged. Also, as shown in FIG. 2B, the sleeve member 20 may have a structure of combining different materials such as quartz and carbon in upper and lower portions. By using heat-resistant carbon etc. in the lower portion, the sleeve member 20 can be arranged to a position nearer to the taper part 11b, and capacity of space can be decreased.

Even when a diameter of the glass preform 11 changes greatly in the drawing ranging from FIG. 3A to FIG. 3C, preferably, a seal of an upper portion is continuously formed without being released, and reuse of the joining member 13 and the sleeve member 20 is enabled.

Here, returning to FIG. 1, a separation distance between positions in which substantial seal operations of the first seal part 17 and the second seal part 18 are performed is set at D, and a distance between the lower end of the sleeve member 20 and a start point portion of the taper part 11b in which an outside diameter of the glass preform 11 changes is set at E.

In order to continuously form the seal in the upper portion of the glass preform 11 without halfway releasing the seal during the drawing, it is necessary to arrange the sleeve member 20 so as to be sealed with the second seal part 18 before the seal of the glass preform 11 with the first seal part 17 is released. For this purpose, the distance E between the taper part 11b and the sleeve member 20 is set so as to be less than or equal to the separation distance D between the first seal part 17 and the second seal part 18.

The separation distance D between the first seal part 17 and the second seal part 18 is also associated with a height of the upper chamber 19, and is set as a design value of equipment. On the other hand, the distance E may vary depending on a length of the diameter contracted part 11c or a taper angle of the taper part 11b by the glass preform 11, and is adjusted to a value smaller than the separation distance D. In addition, when the distance E between the lower end of the sleeve member 20 and the taper part 11b is too short, the sleeve member 20 may be melted and damaged and it may become difficult to reuse the sleeve member 20 depending on the material as described above. As a result, the lower portion of the sleeve member 20 is preferably made of heat-resistant carbon etc. as shown in FIG. 2B. Accordingly, the sleeve member 20 can be made resistant to being melted and damaged.

For adjustment of a mounting position of the sleeve member 20, that is, adjustment of the distance E, for example, when the sleeve member 20 is locked using the lid member 21, a mounting position of the lid member 21 can be adjusted using the hang member 22 as shown in FIG. 3A. Since the sleeve member 20 is fixed to the dummy rod 12 using the lid member 21 etc., the position of the sleeve member 20 can be adjusted relatively easily by changing the mounting position of the lid member 21.

In addition, FIGS. 1, 3A to 3C and 4A to 4C show the example in which the lower end of the sleeve member 20 is arranged so as to abut on the joining member 13 for joining the dummy rod 12, but the lower end of the sleeve member 20 may be located in a position upwardly away from the joining member 13, and may also be located under the joining member 13 by taking the joining member 13 in the sleeve member 20. Also, the sleeve member 20 may be placed and locked in the joining member 13, or may be locked in the lid member 21.

Variations in capacity of space in the case of switching from the first seal part 17 to the second seal part 18 can be minimized by the configuration described above. In addition, in order to reduce variations in pressure in the furnace in the case where the variations in capacity of space occur, preferably, pressure in the upper chamber 19 and the pressure in the furnace are monitored, and the pressure is adjusted by adjusting a gas exhaust amount of the inside of the upper chamber 19 or an inert gas flow rate supplied to the inside of the upper chamber 19 so that variations in pressure do not occur in the case of switching between the seal parts.

Figure 4A:
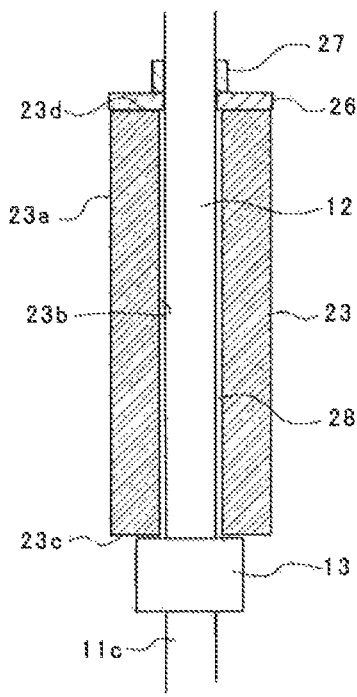
FIGS. 4A to 4C are diagrams showing various examples of sleeve members used in the embodiment of the invention.
Figure 4B:
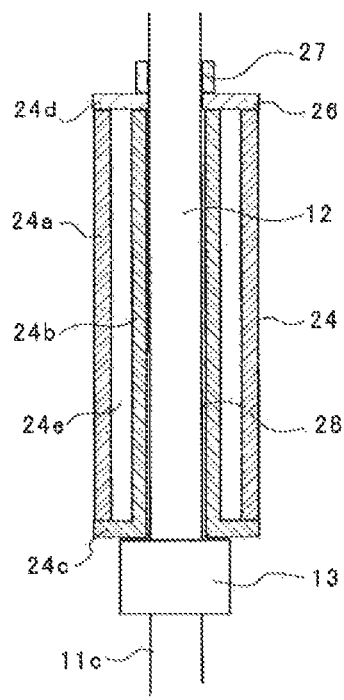
Figure 4C:
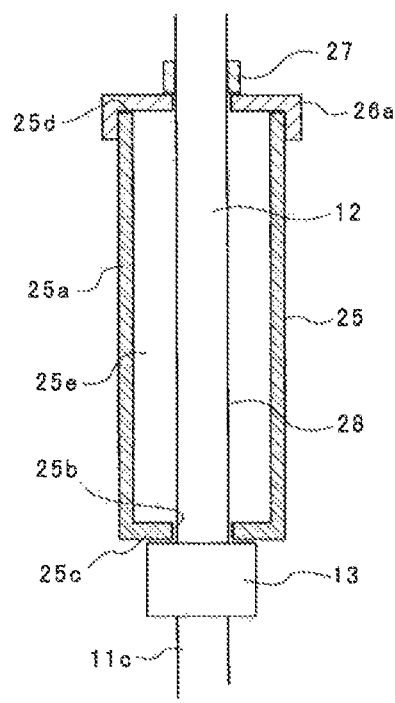

FIGS. 4A to 4C are diagrams showing various examples of sleeve members. A sleeve member 23 shown in FIG. 4A is an example formed in a cylindrical shape having a concentric through hole 23b in an outer peripheral surface 23a, and has a lower end face 23c and an upper end face 23d. The outer peripheral surface 23a is preferably formed in an outside diameter equal to or ⅔ or more an outside diameter of the straight trunk part of the glass preform, and is formed with accuracy higher than or equal to that of the glass preform. The through hole 23b is formed in a diameter of the extent to which the dummy rod 12 can be inserted. The sleeve member 23 is, for example, mounted and fixed in a state in which the lower end face 23c abuts on the joining member 13 and the upper end face is mounted and fixed with or without a lid member 26 interposed so as to surround the outer periphery 28 of the dummy rod 12 by a clamp member 27 etc.

A sleeve member 24 shown in FIG. 4B is an example in which the sleeve member 24 is formed of a thin outside sleeve 24a and a thin inside sleeve 24b and the lower end of the sleeve member 24 is closed by a flange 24c formed integrally to the lower end of the inside sleeve. Like the example of FIG. 4A, an outer peripheral surface of the outside sleeve 24a is preferably formed in an outside diameter equal to or ⅔ or more an outside diameter of the straight trunk part of the glass preform, and is formed with accuracy higher than or equal to that of the glass preform. Also, the inside sleeve 24b is formed so as to have an inside diameter of the extent to which the dummy rod 12 can be inserted, and the sleeve member 24 is closed by the inside sleeve 24b and the flange 24c.

An upper end face 24d of the inside and outside sleeves is closed by the lid member 26, and the sleeve member 24 is mounted and fixed so as to surround the outer periphery 28 of the dummy rod 12 by the clamp member 27 etc. like FIG. 4A. Since this configuration has a cavity part 24e, the sleeve member 24 can be made lighter than the sleeve member 23 of FIG. 4A, but it is necessary to seal this cavity part 24e so as to be separated from outside space connected to the inside of the drawing furnace. In addition, the structure of the sleeve member of FIG. 4B is preferably provided with a gas vent so that gas of the cavity part 24e can be vented with respect to the upper side located in the outside of the drawing furnace.

A sleeve member 25 shown in FIG. 4C is an example in which the sleeve member 25 is formed of a thin sleeve 25a and a flange 25c formed integrally to the lower end of the sleeve and the lower end of the sleeve member 25 is closed by the flange 25c. Like the example of FIG. 4A, an outer peripheral surface of the sleeve 25a is preferably formed in an outside diameter equal to or ⅔ or more an outside diameter of the straight trunk part of the glass preform, and is formed with accuracy higher than or equal to that of the glass preform. Also, the flange 25c is provided with an insertion hole 25b formed in a diameter of the extent to which the dummy rod 12 can be inserted, and the lower end of the sleeve member 25 is closed by the insertion hole 25b and the flange 25c.

An upper end face 25d of the sleeve member 25 is closed by a lid member 26a, and the sleeve member 25 is hermetically mounted and fixed so as to surround the outer periphery 28 of the dummy rod 12 by the clamp member 27 etc. like FIG. 4A. Since this configuration has a structure of omitting the inside sleeve of FIG. 4B, the sleeve member 25 can further be made lighter, but it is necessary to seal a cavity part 25e so as to be separated from outside space connected to the inside of the drawing furnace like the structure of FIG. 4B. In addition, the structure of the sleeve member of FIG. 4C is preferably provided with a gas vent so that gas of the cavity part 25e can be vented with respect to the upper side connected to the outside of the drawing furnace.

All of the sleeve members 23 to 25 are constructed so that the lower end face of the sleeve member is closed and a gap with the dummy rod 12 becomes small. Accordingly, when drawing progresses from FIG. 3B to FIG. 3C, variations in capacity of space in the upper chamber 19 can be decreased efficiently. Also, the sleeve members 23 to 25 have only to be held so as to fix axial movement with respect to the dummy rod 12, and can easily be fixed by, for example, a hanger or the clamp member 27 with a simple shape for gripping the outer peripheral surface of the dummy rod 12. Also, it is necessary to seal the gap with the dummy rod 12 in at least the upper end side of each of the sleeve members 23 to 25, but the gap can easily be sealed by, for example, interposing a seal member such as an O ring.

In the drawing method according to the embodiment described above and the case of being drawn by the method described in FIG. 5A or FIG. 5B, kinds of gas in the furnace were respectively changed to draw glass fibers. Table 1 shows results of measuring variations in glass fiber diameter during drawing at this time.

In addition, A and B of the evaluation result in Table 1 indicate a good result and a problematic result, respectively.

TABLE 1

| Drawing condition | Seal method | Kind of gas | Variations in fiber diameter (μm) | Evaluation result |
|---|---|---|---|---|
| 1 | Embodiment | 100% He | 0.09 | A |
| 2 | FIG. 5A | 100% He | 0.09 | A |
| 3 | FIG. 5B | 100% He | 0.09 | A |
| 4 | Embodiment | 50% Ar + 50% He | 0.09 | A |
| 5 | Embodiment | 100% Ar | 0.10 | A |
| 6 | FIG. 5A | 50% Ar + 50% He | 0.15 | B |
| 7 | FIG. 5A | 100% Ar | 0.18 | B |
| 8 | FIG. 5B | 50% Ar + 50% He | 0.80 | B |
| 9 | FIG. 5B | 100% Ar | 2.20 | B |

In the case of being drawn by the method according to the embodiment, the variations in glass fiber diameter were less than 0.15 μm in all the cases of being drawn using gases in the furnace with 100% He (drawing condition 1), 50% Ar and 50% He (drawing condition 4), and 100% Ar (drawing condition 5).

On the other hand, in the case of being drawn by the method described in FIG. 5A or FIG. 5B, a problem did not occur in the cases of being drawn using gases in the furnace with 100% He (drawing conditions 2, 3), but in the cases of being drawn using gases in the furnace with 50% Ar and 50% He (drawing conditions 6, 8), the variations in glass fiber diameter became greater than the case of being drawn by the method of the embodiment. In the cases of being drawn using gases in the furnace with 100% Ar (drawing conditions 7, 9), the variations in glass fiber diameter became ±0.18 μm in the method of FIG. 5A, and there was a problem that a quartz tube was welded to glass. Also, in the method of FIG. 5B, the variations in glass outside diameter became worse up to ±2.2 μm.

In addition, the invention is not limited to the exemplification described above, and is indicated by the claims, and intends to include all changes within the scope and the meaning equivalent to the claims.

In addition, the present application is based on Japanese patent application (patent application No. 2013-034325) filed on Feb. 25, 2013, and all the contents of the patent application are hereby incorporated by citation. Also, all the references cited herein are incorporated as a whole.

DESCRIPTION OF REFERENCE NUMERALS AND SIGNS

11 GLASS PREFORM
11a STRAIGHT TRUNK PART
11b TAPER PART
11c DIAMETER CONTRACTED PART
12 DUMMY ROD
13 JOINING MEMBER
14 FURNACE CORE TUBE
15 HEATER
16 FURNACE CABINET
17 FIRST SEAL PART
17a GAS SUPPLY PORT
18 SECOND SEAL PART
18a GAS SUPPLY PORT
19 UPPER CHAMBER

20, 23, 24, 25 SLEEVE MEMBER
21, 26, 26a LID MEMBER
22 HANG MEMBER
27 CLAMP MEMBER
28 OUTER PERIPHERY

The invention claimed is:

1. An optical fiber drawing method for drawing an optical fiber by joining an optical fiber glass preform to a dummy rod and hanging and downwardly moving the optical fiber glass preform inside a drawing furnace while sealing with a seal mechanism of an upper part of the drawing furnace, comprising:

starting drawing of the optical fiber;

sealing an outer peripheral surface of the optical fiber glass preform with a first seal part of the seal mechanism; and starting a vicinity of a taper part of the optical fiber glass preform to pass through the first seal part, performing switching to a second seal part arranged above the first seal part, and sealing an outer peripheral surface of a sleeve member fixed so as to surround an outer periphery of the dummy rod with the second seal part and downwardly moving the sleeve member together with the optical fiber glass preform until the drawing is ended.

* * * * *